Jan. 7, 1969 K. B. KINAST 3,421,045

PULSED MAGNETIC DEFLECTION CIRCUIT

Filed April 6, 1965

INVENTOR.
KARL B. KINAST

BY

Laurence S. Epstein
ATTORNEYS

United States Patent Office 3,421,045
Patented Jan. 7, 1969

3,421,045

PULSED MAGNETIC DEFLECTION CIRCUIT

Karl B. Kinast, Westwood, N.J., assignor by mesne assignments, to the United States of America as represented by the Secretary of the Navy Filed Apr. 6, 1965, Ser. No. 446,137
U.S. Cl. 315—27 1 Claim
Int. Cl. H01j 29/70

ABSTRACT OF THE DISCLOSURE

A distortion-free deflection circuit for producing an accurate, continuously variable, television type raster of any arbitrary shape and having symmetry about its vertical axis on electromagnetically deflected CRT's. It eliminates the need for high frequency power amplification required in prior art devices. It employs a novel modulated power supply having a feedback amplifier in the modulating voltage circuit.

Figure 1:
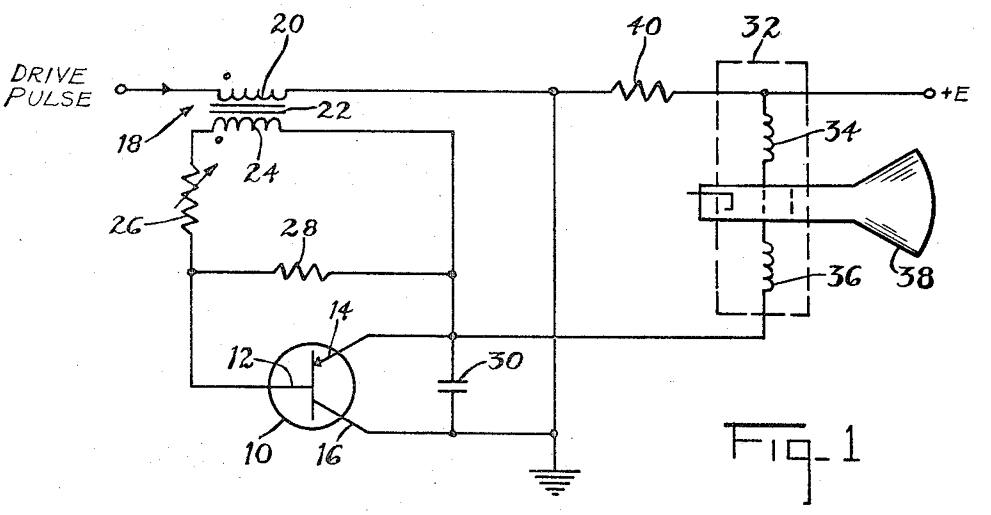

This invention relates generally to a horizontal deflection generator and more particularly to an electro-magnetically deflected cathode ray device capable of producing an accurate, continuously variable, television type raster of any arbitrary shape having symmetry about its vertical axis.

In cathode ray tube (hereinafter referred to as CRT) deflection systems, the raster signal is a function of the (variable) horizontal scanning velocity of the electron beam, proportional to the rate of change of current in the horizontal deflecting yoke. Since the period of each horizontal scan is identical, the amplitude of a scan line is directly proportional to the scan velocity during its period. It is possible to modulate the scan width (or velocity) linearly over a wide range, with frequency response from DC up to a large fraction of the horizontal scanning frequency.

The usual method of generating deflection signals has been to produce the modulated sawtooth as a voltage waveform (an operation of some complexity where Y-axis symmetry is desired) and then to apply this to the yoke via a powerful amplifier.

A typical amplifier system usually consists of a linear amplifier to drive the yoke, in which the yoke current is maintained identical to the input signal. This is accomplished by the addition of a tight negative feedback loop in said amplifier which senses yoke current. While such a method is generally satisfactory for low speed or low power applications, certain difficulties become apparent at the scan frequencies above 10 kilocycles.

At higher scan frequencies, the feedback amplifier is required to have wide frequency response in addition to high gain and low DC drift. Further, at elevated frequencies, a high voltage is induced across the CRT deflection yoke due to the rapid decay of current in the yoke during retrace according to the relationship $E=Ldi/dt$. The amplifier must now have a high output voltage capability to overcome this opposing voltage, in addition to the high output current capability required by a deflecting yoke.

The present invention solves the above difficulties by providing a transistor switching circuit which forms the sawtooth current directly in the yoke, eliminating the need for any high frequency power amplification. The circuit is conservative of the energy stored in the yoke and has an efficiency comparable to those pulse systems now utilized in television scanning, that, however, are not capable of a high degree of modulation depth or frequency response without excessive amplitude, phase and frequency distortion.

It is therefore an object of this invention to provide a solid state, rugged, simple and economic means for generating a horizontal deflection signal for an electro-magnetic CRT.

It is another object of this invention to provide a deflection circuit wherein a distortion free signal may be generated over a wide frequency range.

It is a further object of this invention to provide a deflection circuit which will form a sweep current directly in the yoke of an electro-magnetically deflected CRT without the need for high frequency power amplification.

Figure 2:
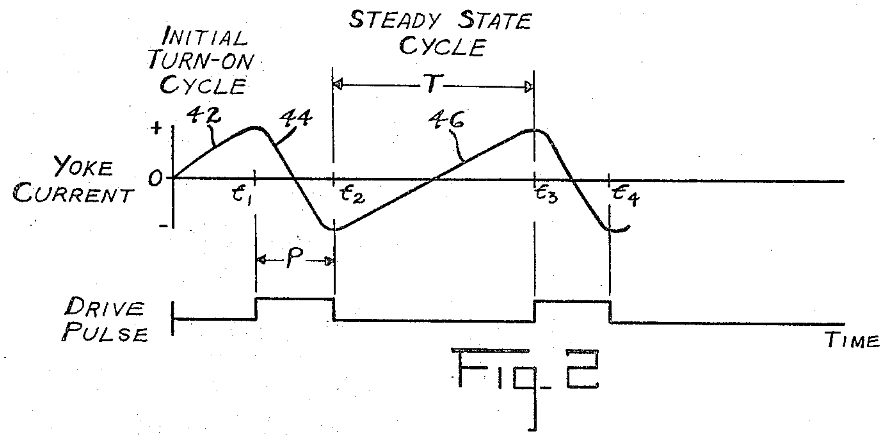

Other objects and many of the attendant advantages of this invention will be readily appreciated as the same becomes better understood by reference to the following detailed description when considered in connection with the accompanying drawings wherein:

FIG. 1 discloses a preferred embodiment of the deflection circuit of this invention;

FIG. 2 discloses a graphic illustration of the operation of the invention; and

Figure 3:
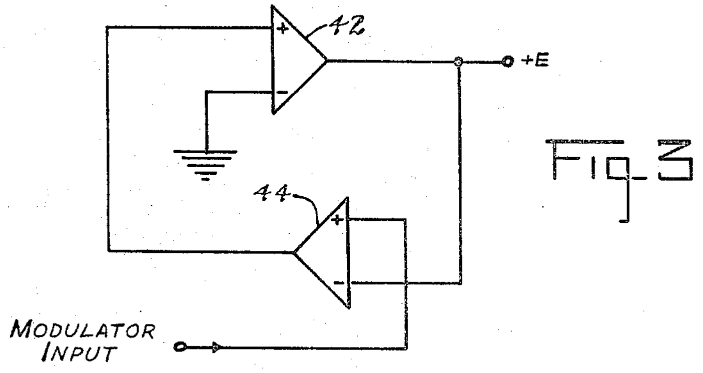

FIG. 3 discloses a power supply utilized with the present invention.

To directly form a proper waveform in the CRT deflection circuit, the present invention utilizes a pulse driven transistorized switch. The output waveform of the switch is a modulated sawtooth waveform having an envelope resembling that of an A.M. radio transmitter. Each cycle of the carrier frequency has a sawtooth shape rather than being sinusoidal, and has zero DC component.

The "carrier" amplitude may be modulated upwards from zero output with acceptable modulation linearity over a wide range. The frequency response to modulation extends from DC up to the carrier frequency and complete response to a step function modulation signal will be achieved in a relatively short time, corresponding to 2 or 3 carrier cycles. Further, the circuit has a high degree of stability with regard to "carrier" amplitude.

Referring to FIG. 1, a switching transistor 10 is connected in common collector configuration having thereon a base 12, an emitter 14 and a collector 16. This transistor is normally saturated and is cut off for several microseconds during the scan retrace time by the horizontal drive pulse P applied to base 12 via transformer 18. Transformer 18 has thereon a primary 20, an iron core 22 and a secondary 24. Variable resistance 26 provides adjustable pulse height for proper driving of transistor 10 while resistance 28 provides proper biasing. Capacitance 30, connected across the output of transistor 10, forms a resonant circuit with the yoke coil 32. Yoke coil 32 contains inductances 34 and 36 which serve to deflect the beam generated within the CRT 38. A resistance 40 serves as a load for the power supply when the transistor is in a cut-off state. In operation, during that portion of the cycle when transistor 10 is conducting, the yoke 32 is connected directly across the voltage source E. At this time capacitor 30 is shorted out by transistor 10. Current flows through yoke 32 and increases almost linearly at a rate $di/dt=E/L$. (E is the power supply voltage and L is the inductance of yoke 32.) When the end of the sweep scan period is reached, the transistor 10 is cut off by the start of the next drive pulse P and capacitance 30 is no longer shorted. The circuit formed by capacitance 30 and yoke 32 now becomes an LC resonant circuit. The resonant frequency is adjusted by the choice of capacitance 30 such that one-half cycle of resonance occurs before the end of pulse P. When pulse P ends, transistor 10 conducts, capacitance 30 is shorted out and yoke 32 is once more connected across the supply voltage E. The reverse current is now in proper polarity to aid the start of the sawtooth current. Because the resonant reversal of current is essentially conservative of energy, the magnitude of this current component is only slightly diminished, causing the total sawtooth amplitude to be increased to almost twice the amplitude it had during the initial turn-on cycle in addition to imparting symmetry about the zero current axis. The rate of change of yoke current starting from its most negative point is almost that twice during the initial cycle. This is the steady state amplitude which will be cyclically maintained if the power supply voltage E is not altered. Graphically, the relationship described above is disclosed in FIG. 2. The initial turn-on period causes a constant current rise beginning from zero and rising to a maximum at time $T_1$. At this time drive pulse P is initiated whereupon transistor 10 is cut off and a resonant circuit is formed as described above. This will begin the resonant cycle depicted as 44 which would end upon the completion of the drive pulse P at time $T_2$. At the end of the one-half cycle of resonance at time $T_2$ the yoke current has reached a maximum in the negative direction, the transition being in the form of a cosine wave. At this point transistor 10 is no longer cut off and capacitance C becomes shorted thereby placing the full supply voltage across deflection yoke coil 32. The yoke current now starts from its most negative point to rise to the maximum point of its cycle depicted as 46 in FIG. 2 until reached at time $T_3$ at which point the next drive pulse is initiated. The cycle is then repeated. Because the switching circuit is comprised only of the inductance of yoke 32, capacitance 30 and resistance 40, in addition to the switch and its power supply, it is obvious that the sawtooth amplitude is dependent on the magnitude of the supply voltage. Accordingly, where desired, linear modulation may be accomplished by the variation of the power supply voltage. When the power supply is utilized as a modulator, modulation frequency response can be extended downward to include DC waveforms. For the regulator power supply a degree of stability as well as linearity is obtainable. This is permissible because the high-gain feedback amplifier required to achieve linearity and stability need only have a frequency response high enough to include the highest modulating frequency component. A circuit utilizable as a regulated power supply for supplying the potential utilized by the circuit of FIG. 1 is disclosed in FIG. 3. Shown therein are an output amplifier 42 and a feedback amplifier 44 connected so as to supply a modulated output voltage having a high degree of stability and linearity. Resistance 40 in FIG. 1 serves as a current path during the negative half of yoke current 12. It could be eliminated if the modulator were designed to accept reverse current as well as supply output current. In any case, resistance 40 would not be required if the only feature desired were a standard power supply not capable of regulation of modulation. In use, the terminal labeled "+E" in FIG. 3 is connected to the terminal "+E" of FIG. 1. A modulating voltage is applied to the terminal of FIG. 3 labeled "Modulator Input." Amplifiers 42 and 44 may be well known components which are commercially available.

Obviously many modifications and variations of the present invention are possible in the light of the above teachings. It is therefore to be understood that within the scope of the appended claims the invention may be practiced otherwise than as specifically described.

What is claimed is:

1. In a deflection circuit, the combination comprising:
- a transistor having a base electrode, an emitter electrode and a collector electrode,
- a source of driving pulses,
- a transformer device having therein a primary coil and a secondary coil,
- means coupling said driving pulses to said primary coil,
- means coupling said secondary coil to said base electrode,
- capacitance means connected between said emitter electrode, and said collector electrode,
- an inductive load coupled to said capacitance means,
- a source of supply voltage connected to said inductive means,
- and means causing said transistor to periodically short out said capacitance means whereby a sawtooth waveform may be generated in said inductive load,
- said supply voltage being maintained by means of a circuit comprising a first amplifier, and a second amplifier, said second amplifier connected in the feedback loop of said first amplifier.

References Cited

UNITED STATES PATENTS

| | | | |
|---|---|---|---|
| 2,996,641 | 8/1961 | Paynter | 315—27 |
| 3,310,705 | 3/1967 | Nicholson | 315—27 |

RODNEY D. BENNETT, *Primary Examiner.*

J. G. BAXTER, *Assistant Examiner.*